July 9, 1929.  W. H. WELCH  1,720,615
DEVICE FOR MANIPULATING TIRES
Filed July 21, 1928   2 Sheets-Sheet 1
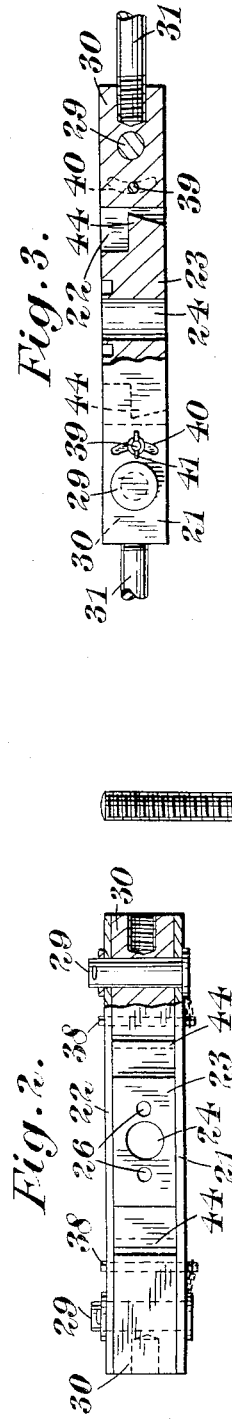
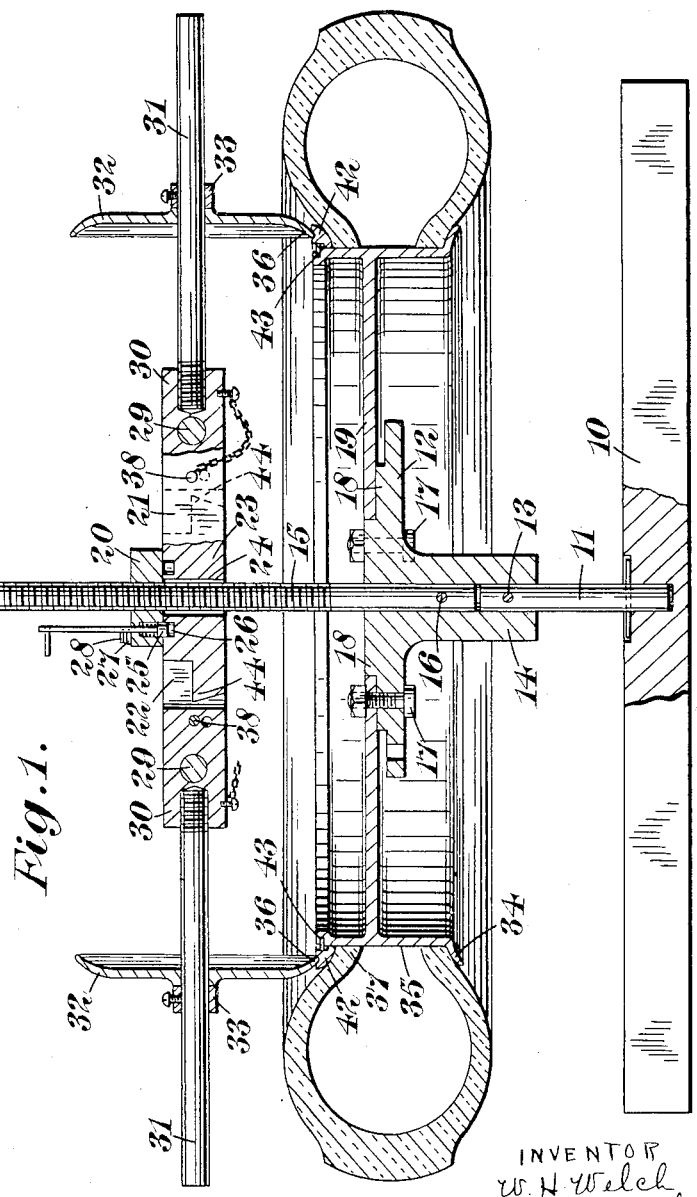
INVENTOR
W. H. Welch
By Wilkinson & Huxta
ATTORNEYS Patented July 9, 1929.

1,720,615

UNITED STATES PATENT OFFICE.

WALTER HENRY WELCH, OF BRISTOL, ENGLAND.

DEVICE FOR MANIPULATING TIRES.

Application filed July 21, 1928, Serial No. 294,534, and in Great Britain May 25, 1928.

This invention is for improvements in or relating to devices for manipulating tires, especially the large straight-sided tires such as are used on heavy vehicles and known as "giant" tires. These tires when in use frequently become rusted on to the rims whereon they are mounted and on which they are initially a tight fit, and difficulty is experienced in removing them therefrom.

Such tires are usually mounted on a rim which has an integral retaining flange on one side and a detachable flange on the other side, the detachable flange being of a size that will pass over the edge of the rim, and it is retained in place by a separate spring locking-ring which engages in a small recess or behind a small lip formed on the rim; this locking-ring projects radially a sufficient distance to provide retaining support for the detachable flange.

For manipulating such tires, it has been proposed to provide devices of the type comprising a support for a tire and rim, which rim may be separable from or integral with the wheel, a pressure-member or -members mounted on a carrier between which and the tire relative rotation about the axis of the latter can take place, so as to cause said member or members to traverse (e. g. with a rolling motion) the part to be pressed (e. g. the detachable flange of the rim, or the tire), and means for producing simultaneously relative movement between said member or members and the part on which pressure is to be exerted in a direction to move the latter relatively to and axially of the rim, for example by imparting a helical movement to the pressure-member or -members about the axis of the tire being treated.

The invention is concerned with devices of the aforesaid type, an example of which is described in my co-pending application Serial No. 254,491, filed February 15th, 1928.

One object of the invention is to improve such devices so as to render them more efficient for manipulating the tire and also the detachable flange aforesaid.

According to one feature of the present invention a tire-manipulating device of the type referred to comprises means for adjusting the inclination of the pressure-member or -members relatively to the axis of the tire.

The known devices of the type to which the invention relates present the disadvantage, owing to the fact that the direction in which pressure is exerted by the pressure-members is unalterable, that the pressure is not always exerted in the direction which is most desirable for the particular work in hand. Thus, devices having the pressure-members so arranged that pressure is exerted thereby in a direction parallel to the axis of the tire are efficient for removing the detachable flange aforesaid, but they are not satisfactory when dealing with the tire itself. These pressure-members act on the face of the tire at some distance from its edge and the tendency is for them to depress the side of the tire and force the edge thereof more tightly against the rim so that a very considerable pressure has to be exerted in order to remove the tire. On the other hand, with pressure-members inclined obliquely to the axis of the tire, as in my aforesaid prior application Serial No. 254,491, the pressure can be exerted much closer to the edge of the tire, but it is not desirable to exert the pressure in this direction when removing the detachable flange. It will be at once appreciated that by providing means for adjusting the inclination of the pressure-members the aforesaid disadvantages are obviated.

In a convenient construction comprising a spider having one or more arms on each of which a pressure-member is mounted, according to the invention each arm is pivotally mounted on said spider and means are provided for locking the arm in the desired angular position.

Other details of the invention are hereinafter described in relation to a specific embodiment of it given by way of example and illustrated in the accompanying drawings, and the novel features are pointed out in the claims appended to this specification.

In the accompanying drawings—

Figure 1 is a sectional elevation of a device according to the invention showing the pressure-members in position for moving the detachable flange;

Figure 2 is a plan, partly in section, of a portion of the spider;

Figure 3 is an elevation, partly in section, of a modified form of spider; and

Like reference numerals indicate like parts in various figures of the drawings.

Figure 4:
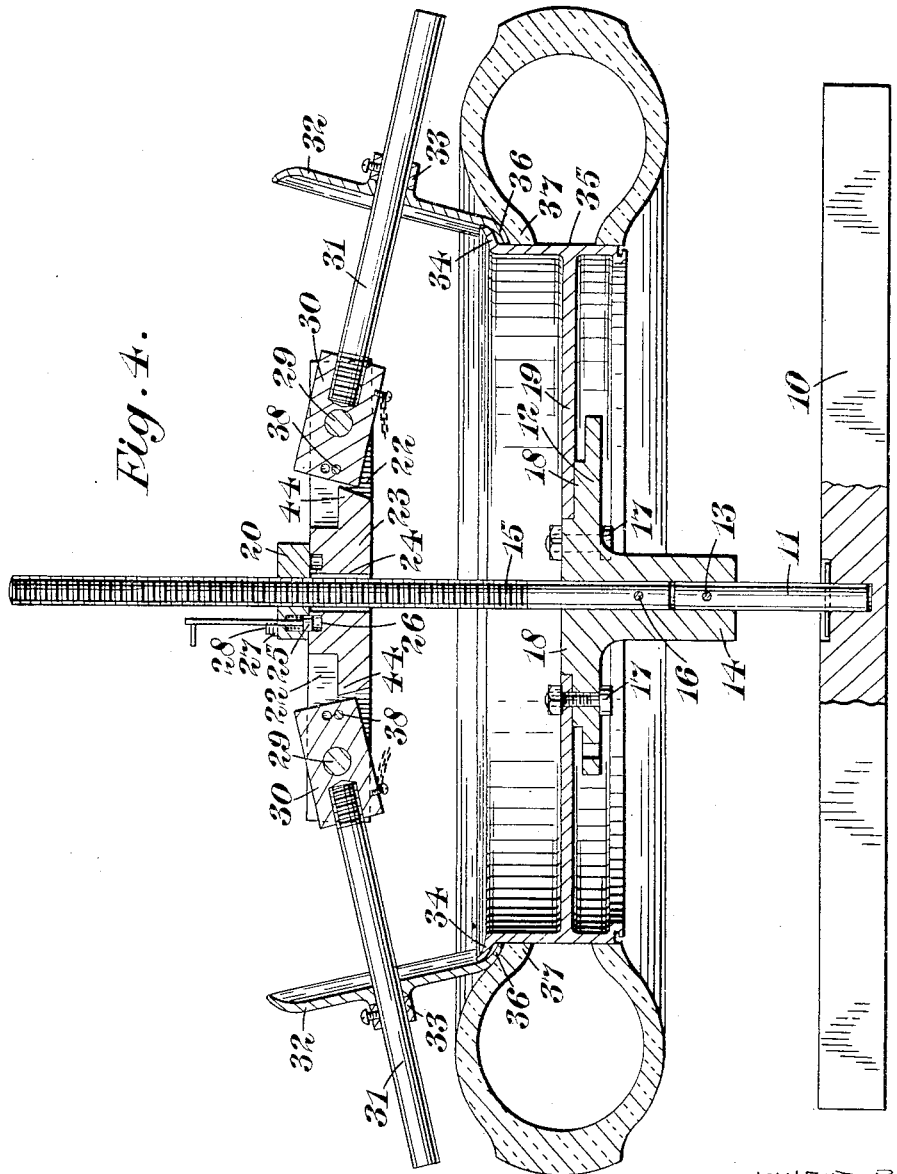
Figure 4 is a view similar to Figure 1 showing the pressure-members in the position which they occupy for removing the tire.

The reference numeral 10 indicates a base upon which there is mounted a column 11, and on this column there is secured a table 12.

This table may, for convenience, be detachable, being secured by a pin 13 passed through a socket 14 on the table and the column. A pillar 15 is mounted centrally on the table 12, conveniently engaging a central bore therein and being retained by a removable pin 16 so that the pillar can be easily removed if desired. The table 12 is arranged to receive adjustable bolts 17 in slots or holes, these bolts being used if desired to secure a wheel on the table by engaging the openings therein which are provided for its ordinary retaining-bolts, and said table is provided with a number of stepped shoulders 18 to engage different sized apertures in the web 19 of the wheel so as to centralize the wheel on the pillar 15.

The pillar 15 is screw-threaded at its upper end, and a nut-member 20 is engaged with the thread. A spider is mounted on the said pillar and comprises two side plates 21, 22, which are connected together by a central block 23 which is provided with an internal bore 24 of sufficient diameter to allow it freely to encircle the screw-threaded portion of the pillar 15, so that it is rotatable and movable endwise thereon without engaging the screw-thread. Means are provided for locking together the nut-member 20 and the block 23, such means comprising, for example a spring-controlled plunger 25 which is carried in the nut-member 20 and can be projected therefrom to engage a notch 26 in the block 23. The plunger 25 is provided with a detent pin 27 so that the plunger can be withdrawn from engagement with the recess 26 and the pin 27 engaged with a ledge 28 which will retain the plunger in its inoperative position.

Between the side plates 21, 22 and at each end thereof is pivotally mounted at 29 a block 30. Each of these blocks carries a cylindrical arm 31 which extends outwardly from the block. On each of the arms 31 a disc-like pressure-member 32 is mounted so that it can rotate freely, its position on the arm 31 being determined by a suitable stop 33. These disc-like members are dished, as shown in Figures 1 and 4, to accommodate the usual integral retaining-flange 34 on the tire rim 35, and to permit the operative edge 36 of the disc to enter beneath said retaining flange and to press on the inner edge 37 of the tire where it bears against the rim.

Any convenient means may be provided for locking the blocks 30, and consequently the arms 31, in their adjusted positions. For instance, as shown in Figures 1, 2 and 4, there may be provided a locking-pin 38 adapted to engage slidably a hole in the side plates and any one of a number of holes, say two, in the block, or, if desired, a number of holes may be provided in the side plate and one in the block. Alternatively, as shown in Figure 3, there may be provided a bolt 39 adapted to engage a hole in the block 30 and slots 40 in the side plates 21, 22, with a wing-nut 41 for locking the block 30 in its adjusted position. If desired, stops may be provided on the plates 21, 22 or on the block 23 to limit and to determine the lowest position of the arms 31. Conveniently the block 23 may be shaped as shown at 44 to constitute the stops aforesaid.

As stated above, the principal use of this device is for the removal of tires from wheels or rims, particularly the large straight-sided tires known as "giant" tires which, after a period of use are sometimes extremely difficult to remove from the rim.

Assuming such a tire is to be removed from the wheel or rim, the pillar 15 is removed from the socket 14, so that the surface of the table 12 is easily accessible for placing the wheel thereon with its detachable flange 42 uppermost, as shown in Figure 1. Such wheels and tires are usually heavy, but by removing the pillar 15 one operator can slide the wheel into position on the table on which it is arranged centrally by means of the appropriate stepped shoulder 18. It can then, if necessary, be secured on the table by the bolts 17. The pillar 15 is then replaced, the spider is mounted on it, and the nut-member 20 is screwed on into proximity with the block 23. The discs 32 are then adjusted each along its arm 31 so that its operative edge 36 bears on the detachable flange 42. The nut-member 20 is screwed down and engaged by the plunger 25 with the block 23. The spider is then rotated by hand in such a direction that the travel of the nut-member 20 is downwards. The block 23 is thereby forced downwards very slowly and the tire is compressed by pushing the detachable flange 42 away from the locking-ring 43. As soon as the detachable flange is clear of the locking-ring one end of the latter is pried out of its groove and one of the discs 32 is then adjusted on its arm 31 so that it enters between the rim and the locking-ring, and the spider is rotated through a complete revolution thereby releasing said locking-ring. The latter is then removed and the detachable flange 42 is free to be lifted off; the tire is then free, but usually it is such a tight fit on the rim or is rusted on so that it is not of itself easily removable. The pillar 15 is again removed, and the wheel with the tire thereon is turned upside down on the table so that the fixed flange 34 is uppermost, as illustrated in Figure 4. The pillar 15 is replaced and the discs 32 are adjusted so as to bear on the edge 37 of the tire as close as possible to the rim 35, and the downward pressing motion is again applied to the tire in the same manner as before, by engaging the nut-member 20 with the block 23. Continued rotation of the spider forces the tire downwards over the rim.

The device can also be used for mounting new tires on wheels or rims, and the operations are similar. If difficulty is experienced in entering the first bead of the tire on to the rim, the spider may be turned upside down, or the arms 31 adjusted so that they are inclined upwardly away from the tire, and the discs 32 are engaged with the beads and slowly fed downwards until they are engaged with the rim. The detachable flange is then put in place and the discs 32 engaged with it to complete the pressing-on of the tire on to the rim. This movement is continued until said detachable flange has been pressed on far enough to permit the insertion of the locking-ring which is sprung into place, thereby securely retaining the tire in position.

When a tire is to be removed from a rim, as distinct from a wheel, suitable bars are provided to extend from the table 12 to the rim to provide the desired support for it.

It is to be understood that the invention is not restricted to the particular embodiment described as various modifications may be made to the constructional details without departing from the invention.

I claim:

1. A tire- and rim-manipulating device, comprising in combination a support for a tire and rim, a pressure-member carrier mounted for rotation about the tire axis and for movement relatively to the tire in the direction of said axis, one or more radial arms pivoted on said carrier, a pressure-member mounted on each of said arms, and means for adjusting each arm so as to vary the inclination of the pressure-member thereon relatively to the tire axis and for securing each arm in the adjusted angular position.

2. A tire- and rim-manipulating device, comprising in combination a support for a tire and rim, a spider mounted for rotation about the tire axis, and movable in the direction of said axis, a plurality of radial arms pivotally mounted on said spider so as to be movable in a plane containing the tire axis, a pressure-member rotatably and slidably mounted on each of said arms, and means for locking each arm in the desired angular position.

3. A tire- and rim-manipulating device, comprising in combination a support for a tire and rim, a spider mounted for rotation about the tire axis and for movement relatively to the tire in the direction of its axis, which spider comprises two side-plates, a block pivotally mounted between said plates at each end thereof, an arm extending outwardly from each block, and a pressure-member mounted on said arm, and means for locking each block in its adjusted position.

4. A tire- and rim-manipulating device, comprising in combination a support for a tire and rim, a member mounted for rotation about the tire axis and for movement relatively to the tire in the direction of its axis, a block pivotally mounted in said member at each end thereof, an arm extending outwardly from each block, and a pressure-member mounted on said arm, means for locking each block in its adjusted position, and means to limit and determine the lowest position to which each arm can turn.

5. A tire- and rim-manipulating device, comprising in combination a support for a tire and rim, a pressure-member carrier which is rotated about the tire axis and movable relatively to the tire in the direction of its axis, a plurality of pressure-discs mounted on said carrier, means whereby the angle at which the pressure discs engage the tire and rim may be changed and whereby the discs may be fixed in this adjusted angular position during the operation of removing the rim or stripping the tire, each of which discs is shaped to accommodate the usual integral retaining-flange on the tire rim, and to permit the operative edge of the disc to enter beneath the retaining flange and to press on the inner edge of the tire where it bears against the rim.

6. A tire and rim manipulating device comprising a support for the tire and rim, a pillar, a spider rotatable and axially movable on the pillar, pressure members connected to said spider for relative adjustment and movable together with the spider axially of the tire and rim, and disconnectible means for permitting of the angular adjustment of the pressure members with respect to the tire and rim prior to the beginning of the operation and adapted to secure the pressure members in the selected angular position throughout the entire operation of removing the rim or stripping the tire.

In testimony whereof I affix my signature.

WALTER HENRY WELCH.